United States Patent Office 3,257,665
Patented June 21, 1966

3,257,665
MANUFACTURE OF DEXTROSE
Leo R. Idaszak, Oak Lawn, Ill., assignor to Corn Products Company, New York, N.Y., a corporation of Delaware
No Drawing. Filed Nov. 23, 1962, Ser. No. 242,864
10 Claims. (Cl. 127—58)

This invention relates to a continuous process for crystallizing dextrose whereby uniform crystals are obtained, thereby affording a massecuite with improved properties. For example, crystals of dextrose may be separated from and purged of mother liquor more readily than heretofore. The massecuite may also be used advantageously in the preparation of the so-called "slab" or cast forms of dextrose or in granular or pellet form, without separation of mother liquor.

At the present time, commercially available anhydrous dextrose and dextrose hydrate are made by batch processes. The principles of manufacturing the hydrate form are described in U.S. Patents 1,471,347, 1,508,569 and 1,521,830, and the anhydrous form in U.S. Patents 1,693,118, 1,722,761 and 1,783,626.

The principles of making the cast form of dextrose have been known for many years. The principles of making dextrose in granular or pellet form without separation of dextrose crystals from mother liquor are described in U.S. Patents 2,369,231 and 2,854,359.

Although the above processes have been used commercially for many years, there are certain difficulties encountered in them. For example, in the production of dextrose hydrate, long periods of time are required for crystallization, necessitating a large capital investment for equipment and housing. The average crystallizing time required to form the dextrose hydrate crystals from the dextrose containing liquor is between 48 and 120 hours. Thus, it will be apparent that a large number of crystallizers are required for any large scale operation. The process for making anhydrous dextrose is a prolonged one, also particularly in that every batch requires considerable time for the concentration of the dextrose liquor and for development of seed. Although the process is not as long as the one for hydrate, it similarly requires a large number of vacuum pans in which the crystallizing is carried out as well as auxiliary equipment to prepare the dextrose liquor for crystallization. Both of the aforementioned processes, due to the time required to carry them out, necessarily keep a large amount of dry substance, i.e., dextrose, in the process. One of the disadvantages of making the cast form of dextrose is the long time required for the dextrose in the liquor to crystallize. Moreover, because of the long time involved in crystallization, the number of shallow containers or pans required for crystallization is necessarily large. Although the method of making dextrose in granular or pellet form, referred to above, is an improvement over the cast form, there still remain some problems in crystallization. It will be readily apparent that there is a need and desire to provide a more simple and economical process for obtaining dextrose in crystalline form than presently available.

It is an object of the present invention to provide a continuous process for crystallizing dextrose from dextrose containing liquors. It is a further object to provide a process whereby evaporation and crystallization of dextrose can be effected continuously in a single vessel. Another object is to provide a process which continuously produces dextrose crystals of better and more uniform quality than obtainable heretofore. Still another object is to provide a process whereby more advantageous use, than heretofore, may be made of the principle of recycling mother liquor, resulting in a better product than is obtained in batch operations. Yet another object is to provide an improved dextrose massecuite which may be used in the production of various forms of dextrose, referred to above, without separation of the crystals from the mother liquor. Other objects will appear hereinafter.

The process of my invention comprises a continuous process for crystallizing dextrose from a dextrose liquor, or solution supersaturated with respect to dextrose, in a vacuum vessel having means whereby evaporation and crystallization of a solution can take place in a single chamber. Continuous processes for crystallizing substances from supersaturated solutions are known, but, as far as I am aware, attempts to use these to crystallize dextrose have not been successful. It is well known in the art that dextrose is very difficult to crystallize, especially in a form from which the mother liquid can be readily purged. The time required for dextrose to crystallize, and particularly in purgeable form, is very long as noted hereinabove. Hence, it was surprising to find that dextrose can be crystallized readily on a continuous basis and in much shorter time than herefore, and that the massecuite is not only readily purgeable but will set up to a firm mass in shorter time than heretofore.

In carrying out the process of my invention, dextrose containing liquors (e.g., such as are obtained from acid and/or or enzyme hydrolysis of starch, remelted crude dextrose, remelted pure dextrose, and combinations thereof) having a dextrose content greater than about 70 percent dextrose, on a dry basis, refined and concentrated in a conventional manner to a suitable density range, e.g., of about 18 to 37° Baumé (15.6/15.6° C.), is used as supply liquor. If it is desired to separate the dextrose crystals from the mother liquor, a dextrose content of greater than 85 percent should be used. The supply liquor is charged to a continuous vacuum evaporator crystallizer, as by means of a pump, and concentrated initially until the dry substance content (D.S.) is about 74 to about 85 percent and the supersaturation of the liquor with respect to dextrose is about 10 to about 65 percent. Preferably, dextrose seed is then added to the concentrated liquor to start the cycle of continuous crystallization although crystallization may be started by means of "shocking" the supersaturated solution. Crystals of dextrose start forming immediately upon the addition of the seed and this crystal formation is allowed to continue until the crystal phase yield, defined hereinafter, is about 5 to about 65 percent at the forementioned supersaturation range. As soon as the desired crystal phase yield is obtained, the massecuite is continuously discharged while simultaneously the dry substance, which has crystallized plus that in the exiting mother liquor, is replaced with fresh supply liquor so that the overall dry substance content in the crystallizer is constant and supersaturation of the liquor with respect to dextrose is maintained. Mother liquor after separation from the dextrose crystals, may be added to the supply liquor, for example, to permit additional dextrose to be obtained therefrom, or it may be removed from the process. On the other hand, the crystallized liquor may be used without removal of mother liquor therefrom.

The evaporator crystallizer is preferably operated under vacuum so as to accelerate evaporation as well as to permit operating at the lower end of the equilibrium temperature range for each stereochemical form of dextrose where boiling is imposed as a required operating condition. The type of equipment is known in the art as a continuous vacuum evaporator crystallizer wherein evaporation and crystallization of a solution take place in one chamber. Means, e.g., a heat exchanger, should be provided to supply the heat lost in the evaporation of water or solvent in the crystallizer. Further, means should be provided to keep the massecuite in motion to insure that crystals and mother liquor are in intimate contact with each other.

In evaporation crystallization, a heat source is required to provide heat for vaporization of the solvent carrier. However, the crystallization of dextrose is highly exothermic. These two factors, heat source requirement plus exothermic reaction, tend to conflict and explain in part the problems encountered in continuous crystallization of dextrose. It is theoretically possible to compensate for exothermic crystallization of dextrose through reduction of heat source, however, such control is usually sluggish and difficult. Reduction of heat source will enable the operator to maintain a constant temperature of the mother liquor or magma, however, a constant temperature is no guarantee of constant crystallizing conditions (e.g., dry substance content of the mother liquor and/or supersaturation remaining constant). For example, the boiling point rise (boiling temperature) may be used to estimate the dry substance content of the mother liquor, which together with temperature and the dextrose content of the liquor enable one to estimate supersaturation. However, the liquor must be boiling for the operator to do this. A slight increase in dry substance content of the mother liquor raises the boiling point above the selected operating temperature, the liquor is no longer boiling, and the selected temperature bears no relationship to the concentration of the mother liquor, i.e., there is no control over the amount of crystals formed. Reduction of heat source or heat input maintains the temperature constant, and prevents the temperature from rising to the boiling point of the mother liquor. Boiling can be induced only by diluting the mother liquor of the massecuite, e.g., by adding water, or supply liquor, or dilute mother liquor from a previous source. The preferred method, as developed for making continuous dextrose crystallization possible, is to add water and heat to insure that boiling is always taking place in the vessel. "Cooling," necessitated by the exothermic dextrose crystallization is obtained through introduction of solvent (water) which through its latent heat of vaporization removes heat, while simultaneously providing the dilution necessary for insuring boiling, thus maintaining constant conditions (temperature, dry substance content, and supersaturation).

The degree of supersaturation of the liquor in respect of dextrose is dependent upon the dry substance content of the mother liquor, the temperature of the massecuite and composition of the mother liquor. Means, such as adjustment by dilution with water and/or mother liquor and/or supply and/or temperature of the liquor, should be provided at the moment of discharge to prevent shock crystallization of the mother liquor in the discharged massecuite.

Known means are provided for removal of massecuite at a predetermined rate and simultaneous introduction of supply liquor.

The seed may be added by making a small amount of a slurry of dry seed and supply liquor and adding it to the crystallizer when the concentrated liquor in the crystallizer is at the desired dry substance concentration and supersaturation. Or the seed may be added by slurrying it, in dry form, in the supply liquor at such concentration that the supply liquor can still be introduced into the heating chamber. The amount of seed required is readily ascertainable by those skilled in the art and is governed more by the number of crystals or nuclei than the weight of the seed. Generally, 0.1 to 5 percent of seed, based on dry substance of the liquor, is satisfactory.

The term "crystal phase yield," expressed as percent, as used herein is defined thus:

Crystal phase yield of the massecuite $$= \frac{\text{wt. dextrose crystals} \times 100}{\text{total D.S.}}$$

Where the term "supersaturation" is used herein, it is intended to mean that the liquor is supersaturated with respect to dextrose on an impurity free basis. Percent supersaturation at temperature T is defined as $$\left(\frac{c}{co} - 1\right)100 = \text{percent supersaturated}$$

where $c$ = unit by weight of dextrose per unit by weight of water at operating temperature T $co$ = unit by weight of dextrose per unit by weight of water in equilibrium at temperature T.

The temperature at which the process is carried out will depend upon the type of crystals desired. (Jackson, R. F., and C. G. Silsbee, Natl. Bur. Stds. (U.S.), Sci. Papers, No. 437, 715–724 (1922).) If it is desired to produce alpha anhydrous dextrose crystals, the temperature is maintained within the range of about 50° C. to 90° C. (122° F. to 195° F.), although it may be possible to crystallize the alpha anhydrous dextrose in the metastable range of about 50° C. to 28° C. (122° F. to 82° F.) where the seed bed contains essentially all alpha anhydrous dextrose crystals. For dextrose hydrate crystals the temperature is between about 18° C. to 50° C. (65° F. to 122° F.). For beta anhydrous dextrose the temperature is above about 115° C. (239° F.), although lower temperatures may be possible where the seed bed contains essentially all beta anhydrous dextrose.

The following examples are typical and informative only and are intended to further illustrate the invention, but are not to be considered as limiting the invention in any manner.

*Example I*

The vacuum evaporator crystallizer was equipped with a heat exchanger to provide heat to evaporate the liquor and with a recirculating pump as integral parts thereof. The operating volume of the crystallizer was about 473 liters. This level was maintained throughout the test; the absolute pressure in the evaporator was controlled at approximately 102 mm. of mercury, absolute.

The evaporator crystallizer was charged by means of the pressure differential created by the vacuum in the crystallizer and maintained at the operating level with supply liquor consisting of commercial refined dextrose liquor, obtained from the hydrolysis of starch, and having a gravity of 30° Baumé, a D.E. value of 98 percent (97 percent dextrose, dry basis). The supply liquor was evaporated until the dry substance reached 83% (temperature 180° F.). At this point the vessel contained 545 kg. (500–590) of dry substance. Anhydrous dextrose seed in the amount of 5.45 kg. was slurried into 7.6 liters of supply liquor and pulled into the vessel through the suction side of the recirculating pump. The supersaturation of the liquor in the crystallizer at the time of entry of the seed into the vessel was 45 percent (40–50). As soon as crystal formation began to take place, supply liquor was added to replace the water lost by evaporation and the dry substance crystallized. Water was added intermittently to maintain the supersaturation thereof at 45 percent (40–50).

When a crystal phase yield of approximately 37 percent was obtained, the massecuite was discharged at a rate of 0.38 liter per minute. Supply liquor was added at the rate of 0.7 liter per minute to replace the dry substance removed. The evaporator crystallizer was operated for 6 hours under the balanced conditions aforementioned. The temperature of the massecuite was maintained at 65.6° C. to 68.9° C. (150° F. to 156° F.). The average crystal phase yield during the test was about 37 percent. The crystals were separated from the mother liquor by means of a centrifuge.

The crystals obtained were in the anhydrous form and were sharply defined, clear, and brilliantly white in character. They were readily separated from the mother liquor.

Screen analyses, set forth in Table I hereinafter, show that 50 percent of the crystals were at least 0.28 mm. in size, thus demonstrating the superiority of the process over the batch process.

*Examples II and III*

Two additional runs were made as described in Example I with variations, as indicated hereinafter. Similar results were obtained as in the first run, which together with those of the first run are set forth in Table I. Screen analyses were made on a composite product of Examples I, II and III.

TABLE I

| Test No. | Duration of Test, hrs. | Supply Rate, liters/min. | Discharge Rate, liters/min. | Retention Time in System, hrs. | Operating Temperature | Supersaturation, percent | Crystal Phase Yield, percent | Recirculating Rate in Heat Exchanger, liters/min. |
|---|---|---|---|---|---|---|---|---|
| 1 | 6 | 0.70 | 0.38 | 20.8 | 65.6° C. (150° F.) | 45 | 37 | 350 |
| 2 | 9 | 0.91 | 0.50 | 15.6 | 65.6° C. (150° F.) | 45 | 30 | 368 |
| 3 | 6 | 1.50 | 0.80 | 9.7 | 66.7° C. (152° F.) | 44 | 38 | 395 |

COMPOSITE DRY PRODUCT SCREEN ANALYSES

| U.S. Screen Mesh | 30 | 40 | 50 | 70 | 100 | Pan |
|---|---|---|---|---|---|---|
| Sieve Opening (mm.) | 0.59 | 0.42 | 0.297 | 0.21 | 0.149 | |
| Percent Retained | 5.3 | 15.6 | 25.1 | 30.2 | 17.5 | 6.9 |

In the preparation of dextrose hydrate crystals, the same procedure, as described above, is used, except that the operating temperature is maintained below 50° C. (122° F.). Dextrose hydrate is used as seed.

Similarly, beta anhydrous dextrose may be made by keeping the temperature about 115° C. (239° F.) and using beta anhydrous dextrose as seed, or with temperatures below 115° C. (239° F.) where the seed bed contains sufficient beta anhydrous dextrose crystals to inhibit formation of other types of dextrose crystals.

A distinct advantage of continuous crystallization lies in the fact that operation of the process may be carried out at constant conditions once equilibrium is established. In batch crystallizers, the condition of the massecuite, and, specifically, the mother liquor, vary during the cycle. The dextrose content of the mother liquor, dry substance concentration, solubility, viscosity and other physical properties are continually changing as soluble dextrose crystallizes out of solution. The problem is further compounded if temperature also varies, as it must, with a cooling type batch crystallizer, or as it is sometimes advantageous to do with a batch evaporative strike pan. Continuous crystallization of dextrose, however, enables an operator to choose a specified operating condition which, once equilibrium is achieved, can be maintained with commercially available control apparatus for insuring the constancy of such operating parameters as rate, temperature, pressure, level, etc. Thus the type of variations inherent with batch crystallization of dextrose, mentioned above, is essentially eliminated with continuous crystallization of dextrose. The constancy of the properties of the magma and operating conditions is conducive to more uniform crystal growth resulting in the subsequent advantages of increased uniformity and size of crystals, quality, purity, purging quality, etc. In addition to the advantages provided by my invention in making the regular grades of anhydrous and hydrate dextrose crystals, it also provides a massecuite which is ideal for other forms of dextrose since the massecuite is heavily nucleated. This is particularly advantageous in decreasing the time required for the massecuite to set to a firm mass. Likewise, such a massecuite improves the process of making dextrose in granular or pellet form, referred to above, wherein the massecuite is sprayed on a bed of dextrose crystals.

I claim:

1. A process for continuously crystallizing dextrose from a dextrose containing liquor which comprises continuously evaporating a dextrose supply liquor until the dry substance content of the liquor at the beginning of the cycle is about 74 to about 85 percent and the supersaturation with respect to dextrose is about 10 to about 65 percent, in a vessel having means for continuously and simultaneously evaporating a liquor and permitting crystallization thereof in a single chamber; inducing crystallization to start the cycle of crystallization; allowing crystals to form until the crystal phase yield is about 5 to about 65 percent; and maintaining said crystal phase yield by continuously discharging massecuite and simultaneously adding to, and evaporating, supply liquor in the vessel, at such a rate that supersaturation, dry substance content of the mother liquor, and temperature remain constant for said crystal phase yield; said supply liquor having a density of about 18 to 37° Baumé and a dextrose content above about 70 percent, on a dry basis.

2. Process according to claim 1 wherein the evaporation and crystallization are effected under vacuum and the temperature range during crystal formation is maintained at about 50° C. to 90° C., whereby essentially all alpha anhydrous dextrose crystals are obtained.

3. Process according to claim 1 wherein the evaporation and crystallization are effected under vacuum and the temperature during crystal formation is maintained at about 18° C. to 50° C., whereby essentially all dextrose hydrate crystals are formed.

4. Process according to claim 1 wherein the temperature during crystal formation is maintained at above 115° C., whereby beta anhydrous dextrose crystals are formed.

5. Process according to claim 1 wherein the temperature is maintained constant by adjusting the water content of the massecuite.

6. Process according to claim 1 wherein the crystals are separated from the mother liquor in the massecuite and the mother liquor is returned to the process whereby additional crystals are obtained therefrom.

7. Process according to claim 1 wherein crystallization is induced by "shocking" the supersaturated solution in the crystallizer.

8. Process according to claim 1 wherein crystallization is induced by seeding supersaturated liquor in the crystallizer.

9. Process according to claim 1 whereby supersaturation of the mother liquor in the discharged massecuite is relieved by adjusting the temperature and the water content of the massecuite.

10. Process according to claim 1 wherein the dextrose content of the supply liquor is greater than 85 percent and the crystals are separated from the mother liquor.

References Cited by the Examiner

UNITED STATES PATENTS

| 1,976,361 | 10/1934 | Newkirk | 127—58 |
|---|---|---|---|
| 2,032,160 | 2/1936 | Widmer | 127—58 |
| 2,369,231 | 2/1945 | Harding | 127—16 |

MORRIS O. WOLK, *Primary Examiner.*

M. E. ROGERS, *Assistant Examiner.*